(12) United States Patent
Kent, Jr. et al.

(10) Patent No.: US 7,734,294 B2
(45) Date of Patent: *Jun. 8, 2010

(54) INTELLIGENT INTERACTIVE CALL HANDLING

(75) Inventors: Larry G. Kent, Jr., Loganville, GA (US); W. Todd Daniell, Marietta, GA (US); Mary S. Arnoff, Lawrenceville, GA (US)

(73) Assignee: AT&T Intellectual Property, I,L.P., Reno, NV (US)

( * ) Notice: Subject to any disclaimer, the term of this patent is extended or adjusted under 35 U.S.C. 154(b) by 976 days.

This patent is subject to a terminal disclaimer.

(21) Appl. No.: 10/755,491

(22) Filed: Jan. 12, 2004

(65) Prior Publication Data

US 2005/0153699 A1 Jul. 14, 2005

(51) Int. Cl.
*H04W 40/00* (2009.01)
*H04L 12/66* (2006.01)
(52) U.S. Cl. .................. 455/445; 455/458; 455/459; 379/88.13; 379/211.04
(58) Field of Classification Search ............... 455/445, 455/458, 459; 370/352, 354; 379/88.13, 379/88.17, 88.19, 93.24, 142.01, 142.08, 379/211.01, 215.01, 221.08, 230
See application file for complete search history.

(56) References Cited

U.S. PATENT DOCUMENTS

| 5,930,700 | A * | 7/1999 | Pepper et al. ............ 455/435.3 |
|---|---|---|---|
| 6,683,870 | B1 * | 1/2004 | Archer ....................... 370/356 |
| 6,763,095 | B1 * | 7/2004 | Cermak et al. ........... 379/93.23 |
| 2002/0136206 | A1 * | 9/2002 | Gallant et al. ............... 370/352 |
| 2003/0039242 | A1 * | 2/2003 | Moore, Jr. ................... 370/354 |
| 2003/0041048 | A1 * | 2/2003 | Balasuriya .................... 707/1 |
| 2003/0135624 | A1 * | 7/2003 | McKinnon et al. .......... 709/228 |
| 2004/0005042 | A1 * | 1/2004 | Dhara et al. ........... 379/142.01 |
| 2004/0213212 | A1 * | 10/2004 | Reding et al. ............... 370/352 |
| 2004/0264654 | A1 * | 12/2004 | Reding et al. ............ 379/88.12 |

* cited by examiner

*Primary Examiner*—Melur Ramakrishnaiah
(74) *Attorney, Agent, or Firm*—Cantor Colburn LLP

(57) ABSTRACT

An intelligent interactive call handling system is provided that typically includes a central office, a service control point, and an internet call routing system. The central office typically triggers a query responsive to receiving a call request. The service control point is coupled to the central office, receives the query, and triggers an internet call routing query. The internet call routing system, which is coupled to the service control point, typically receives the internet call routing query, determines presence of the called party with respect to at least one registered communication device, sends a prompt to the called party at said at least one registered communication device responsive to the presence determination, receives a reply from said at least one registered communication device, and routes the call responsive to the reply. Methods and other systems are also provided.

32 Claims, 7 Drawing Sheets

INTELLIGENT INTERACTIVE CALL HANDLING

TECHNICAL FIELD

The present disclosure is generally related to telecommunications and more particularly to call handling.

DESCRIPTION OF THE RELATED ART

The telecommunications industry has undergone rapid changes in the past several years. With the development of the advanced intelligent network (AIN), telephone companies are poised to offer a multitude of new services to subscribers. One service that many telephone service providers now offer is a call center, which can be facilitated by the AIN. One example of an AIN is further described in U.S. Pat. No. 5,701,301 and U.S. Pat. No. 5,838,774, each of which is hereby incorporated by reference. The call center can typically comprise an interactive voice response (IVR) system that typically interacts with a calling party over the telephone network through dualtone multi-frequency (DTMF) of DTMF signaling in the public switched telephone network (PSTN).

AIN embodiments in the United States use a signaling system 7 (SS7) protocol to transport messages. The AIN typically comprises service switching points (SSPs), service nodes (SNs), signal transfer points (STPs), and service control points (SCPs). An SSP is typically an AIN-compatible switching office. The SN is a smart termination device that assesses incoming call information and make appropriate connections. The SSPs are connected by a number of STPs which transfer data among the SSPs and between the SSPs and SCPs. The STPs can generally be described as the routers which read the packet and transfer it to the called party SSP. Finally, the SCP is typically a fault tolerant computer that is typically coupled to a central database. This central database comprises a host of subscriber and routing information.

For better understanding a call routing sequence on an SS7 network will now be described. Typically, when a call is placed a calling party dials a telephone number and an SSP receives the place call request and routes it to the proper SSP associated with the called party. When the called party SSP receives the call request, it causes a trigger to fire. This trigger then causes the SSP to send a query across the STPs to an SCP. The query typically comprises asking the SCP how the call should be handled, such as subscriber specific instructions/handling and any other specific routing information that is necessary. After receiving handling information from the SCP, the SSP uses these instructions to create a packet to send across the STPs to the called party SSP. Typically the SCP will merely instruct the SSP to connect the call, however, the called party may have special instructions for incoming calls.

The subscriber specific instructions/handling can include a service such as caller ID. However, if a user is not present to receive the call, the value of caller ID feature is reduced. Therefore, there is a need for systems and methods that address these and/or other perceived shortcomings.

SUMMARY OF THE DISCLOSURE

One embodiment, among others, of the present disclosure provides for an intelligent interactive call handling system. A representative system, among others, includes a central office, a service control point, and an internet call routing system. The central office typically triggers a query responsive to receiving a call request. The service control point is coupled to the central office, receives the query, and triggers an internet call routing query. The internet call routing system, which is coupled to the service control point, typically receives the internet call routing query, determines presence of the called party with respect to at least one registered communication device, sends a prompt to the called party at said at least one registered communication device responsive to the presence determination, receives a reply from said at least one registered communication device, and routes the call responsive to the reply.

One embodiment, among others, of the present disclosure provides methods for providing intelligent interactive call handling. A representative method, among others, can include the following steps: receiving a call query from a service control point via a gateway; determining whether a called party associated with the call query is present with respect to at least one registered communication device associated with the called party; sending a prompt to the called party via said at least one registered communication device responsive to the presence determination; receiving a reply from the called party via said at least one registered communication device; and, connecting the call responsive to the reply.

Other systems, methods, and/or computer programs products according to embodiments will be or become apparent to one with skill in the art upon review of the following drawings and detailed description. It is intended that all such additional system, methods, and/or computer program products be included within this description, be within the scope of the present disclosure, and be protected by the accompanying claims.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

The disclosure now will be described more fully with reference to the accompanying drawings. The disclosure may, however, be embodied in many different forms and should not be construed as limited to the embodiments set forth herein;

rather, these embodiments are intended to convey the scope of the disclosure to those skilled in the art. Furthermore, all "examples" given herein are intended to be non-limiting.

Figure 1A:
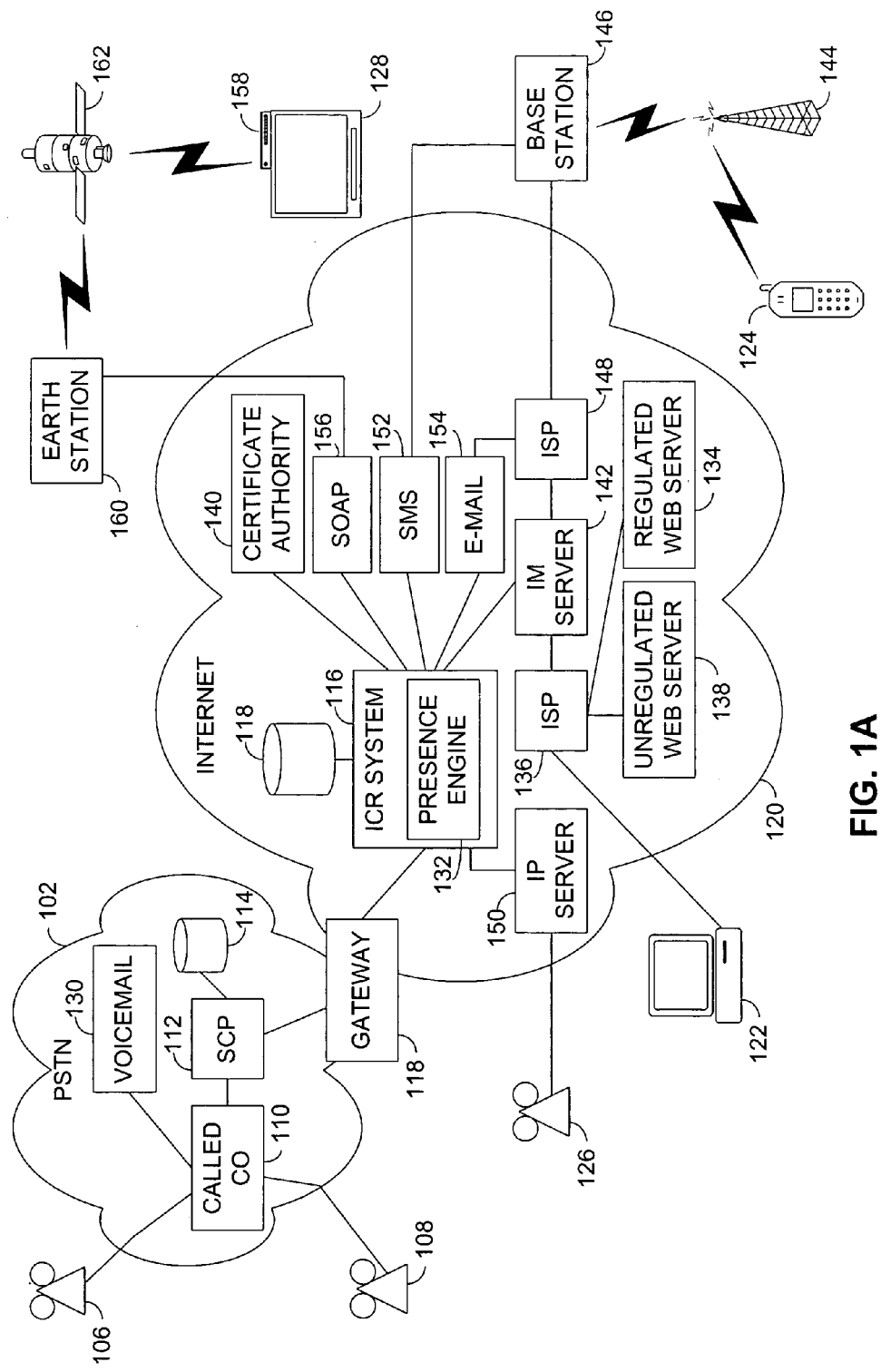
FIG. 1A is a block diagram illustrating an embodiment, among others, of a system of the present disclosure.

Referring to FIG. 1A, shown is an embodiment, among others, of a typical system 100 of the present disclosure. In particular, the system 100 includes a public switched telephone network (PSTN) 102 and the internet 104. The PSTN generally includes such elements as central offices (COs) which are SSPs in the AIN architecture, SCPs which are conventionally used to query for subscriber specific instructions, and STPs which are transfer points for the network. A call from a calling party telephone 106 to a called party telephone 108 is typically routed to a called party CO 110, as is known in the art. At the calling party CO 110 a termination attempt trigger is typically fired when the CO 110 receives the call request from the calling party telephone 106. The termination attempt trigger causes a query to be sent to the SCP 112 to determine whether the called party has specified any particular instructions for incoming calls, such as caller ID, call forwarding, etc. Conventional SCPs 112 use a database 114 to determine whether any particular instructions exist for the call. Upon finding the instructions for the call, the SCP 112 typically sends instructions to the called party CO 110 for terminating the call. Typically, the called party CO 110 would send a ring signal to the called party telephone 108 (or a forwarding number saved within the SCP 112) to alert the user to the incoming call. Additionally, the called party CO 110 includes packets of information regarding the calling party based on services to which the called party subscribes.

In an embodiment, among others, of the present disclosure, the database 114 associated with the SCP 112 includes an internet protocol (IP) address for an internet call routing system 116, a phone number for the called party, and a registration ID associated with the called party. In various embodiments of the present disclosure, among others, the internet call routing system 116 is operable to provide routing instructions to the SCP 112. Thus, the SCP 112, in some implementations, is relieved of the burden of saving call instruction for particular customers. The SCP communicates with the internet call routing system 116 via a gateway 118. As those skilled in the art should understand, the gateway 118 is used to bridge the protocol gap between the PSTN 102 and the internet 120, therefore the gateway 118 is shown residing on both the PSTN 102 and the internet 120. The gateway 118 typically communicates with the internet call routing system 116 using an extensible markup language (XML) language. However, one skilled in the art should recognize that alternative embodiments exist, wherein the communication between the gateway 118 and the internet call routing system 116 are in any of a plurality of compatible formats.

Upon receiving a query from the called party CO 110, the SCP 112 retrieves the IP address of the internet call routing system 116, and sends the called party telephone number and a registration ID associated with the called party telephone number to the internet call routing system 116. The registration ID in one embodiment, among others, of the present disclosure is provided by the internet call routing system 116 during the installation process described with respect to FIG. 2. However, one skilled in the art should recognize that there are other embodiments, where there is no registration ID, and the called phone number suffices for identification purposes. The internet call routing system 116 is connected to a database 118. The database is typically operable to store profiles, rules and registration IDs associated with users. The profiles, rules and registration IDs facilitate a determination by the internet call routing system 116 as to whether the user has subscribed to any enhanced features offered by the internet call routing system 116.

In various embodiments, among others, of the present disclosure, the internet call routing system 116 enables the called party to set up their account to provide notice of the call to any registered device 122-128 at which the user associated with the called party number is present. Presence is typically determined based upon a presence engine 132, which in some implementations operates similarly to a instant messaging presence system. Further, in some implementations, the internet call routing system 116 forwards the call to a registered device 122-128 at which the user is present. In yet another embodiment, among others, the internet call routing system 116 interacts with the user via an internet based message to determine how to handle the call. For example, the internet call routing system 116 in various implementations handles the call by: letting the call ring at the dialed number, forwarding the call to the voicemail system 130, forwarding the call to the location at which the internet based message was checked (e.g. the currently present location), forwarding the call to one of a number of previously designated numbers, forwarding the call to a default number, forwarding the call to a number designated by the user.

In order to use the internet call routing system, a user typically uses a computer 122 to access a regulated web page associated with his or her telephone service provider. The regulated web page is typically provided by a regulated web server 134 via an internet service provider (ISP) 136. In some embodiments, among others, of the present disclosure, the ISP 136 is the telephone service provider. Those skilled in the art should understand that Federal Communication Commission (FCC) regulations typically require that common carrier functions be kept separate from ISP functions. Thus, the web page for the carrier is provided by the regulated web server 134. One skilled in the art should recognize that some service providers are unregulated in some markets, and that the FCC could deregulate separation between telephone service and internet service. As such, there is no regulation requiring a web server for regulated service (telephone, long distance, etc.) being separated from the web server for unregulated service (data service, network repair, etc.). Thus, in some embodiments, among others, of the present disclosure, the regulated and unregulated web server functions are combined on a single web server.

Using the regulated web server 134, the user is typically able to update his or her account preferences. If the user chooses to subscribe to the services provided by the internet call routing system, the user typically inputs his or her phone number and a password associated with the phone number, and send the information to the regulated web server 134. The regulated web server 134 then typically sends an e-mail to the user. The e-mail, in some implementations, among others, includes a certificate ID (not shown).

Upon receiving the certificate ID, the user typically use the computer 122 to download software (not shown) from an unregulated web server 138. Upon completing the download to the computer 122, the user typically installs the downloaded software on his or her computer 122 and provide the certificate sent via e-mail. During the installation process the computer 122 will typically connect to the internet call routing system 116 via the ISP 136 and the internet 120. The internet call routing system 116 will configure the user's account and create a profile and rules for the user in the database 118. The internet call routing system will also authenticate the user with the certificate via a certificate authority 140. In some implementations, among others, the certificate authority 140 uses a maximum distance separable (MDS) hashing scheme to ensure the authenticity of the certificate provided by the user.

After installing the software, the user typically configures his or her account by registering his or her devices with the internet call routing system 116 and storing his or her preferences in the database 118. Moreover, in some implementations, the user is able to create rules for handling incoming calls. These rules include, among others: sending the call to the dialed number or forwarding the call to another number during certain hours; forwarding the call to voicemail, a present device, etc. based upon the calling party number; prompting a present device for instruction from the user; and/or, sending the call to the dialed number within a certain number of seconds if no other instruction has been received. These rules are similarly stored in the database 118 associated with the internet call routing system 116. For processing these rules, the internet call routing system 116 typically uses a rules engine (not shown). A suitable rules engine is described in U.S. Patent application entitled "Processing Rules for Digital Messaging," filed on Oct. 14, 2003 and having Ser. No. 10/686,433, which is entirely incorporated herein by reference. One skilled in the art will recognize that the Ser. No. 10/686,433 application specifically refers to a client-based rules engine, but that the rules engine is easily modified to provide a server-based rules engine.

The presence engine can be configured to track presence on myriad IP devices, such as, for example, but not limited to: an computer 122 via an ISP 136 and/or a instant messaging (IM) server 142; a G3 mobile phone 124 through an antenna 144 via a base station 146 coupled to an ISP 148; an IP phone 126 coupled to the internet 120 via a internet phone server 150. One skilled in the art should also recognize that a GPS equipped phone could relay presence information based upon whether or not the GPS phone is moving. Furthermore, a short message service (SMS) server 152 could determine presence based upon whether the user has retrieved the message from the SMS server 152, and an e-mail server 154 could be equipped to determine presence based upon a read receipt, as known in the art. Furthermore, the internet call routing system 116 could communicate information to devices that cannot communicate bidirectionally such as, for example, using a simple object access protocol (SOAP) server 156 to communicate an XML-based message to a television 128 having a set-top box 158 via a base station 160 and satellite 162. One skilled in the art should recognize that there are other systems by which to send messages to users and/or determine the presence of a user, and each of these is intended to be included within the scope of the present disclosure.

Figure 1B:
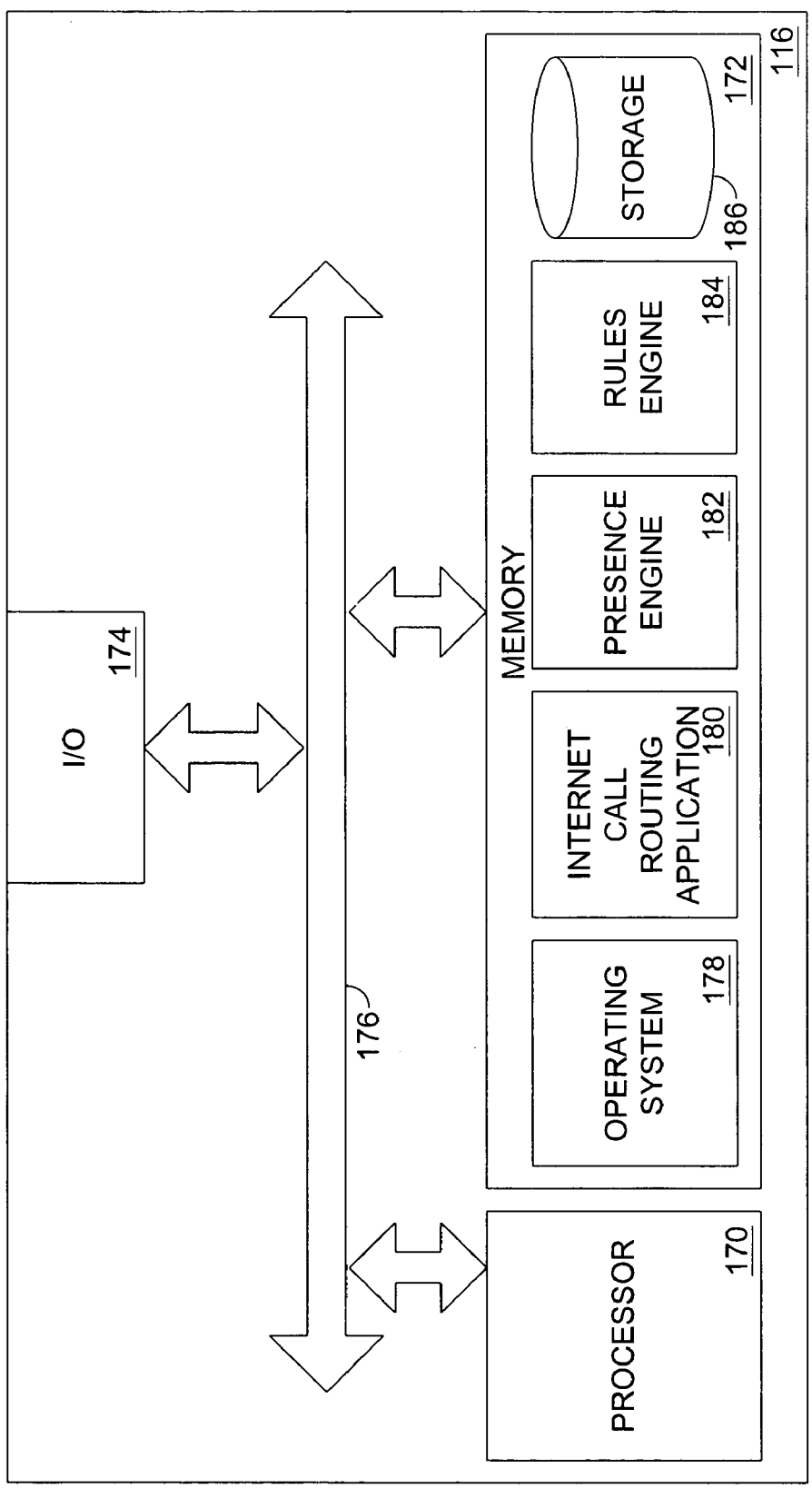
FIG. 1B is a block diagram illustrating an embodiment, among others, of the internet call routing system of FIG. 1A.

Referring now to FIG. 1B, shown is a block diagram of an embodiment, among others, of the internet call routing system 116 shown in FIG. 1A. Generally, in terms of hardware architecture, as shown in FIG. 1B, the server 116 includes a processor 170, memory 172, and one or more input and/or output (I/O) devices 174 (or peripherals) that are communicatively coupled via a local interface 176. The local interface 176 can be, for example but not limited to, one or more buses or other wired or wireless connections, as is known in the art. The local interface 176 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 170 is a hardware device for executing software, particularly that stored in memory 172. The processor 170 can be any custom made or commercially available processor, a central processing unit (CPU), an auxiliary processor among several processors, a semiconductor based microprocessor (in the form of a microchip or chip set), a macroprocessor, or generally any device for executing software instructions.

The memory 172 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 172 may incorporate electronic, magnetic, optical, and/or other types of storage media. Note that the memory 172 can have a distributed architecture, where various components are situated remote from one another, but can be accessed by the processor 170.

The software in memory 172 may include one or more separate programs 178, 180, 182, 184, each of which comprises an ordered listing of executable instructions for implementing logical functions. In the example of FIG. 1B, the software in the memory 172 includes a internet call routing application 180 and a suitable operating system (O/S) 178. The operating system 178 essentially controls the execution of other computer programs, such as the internet call routing application 180, presence engine 182, and rules engine 184, and provides scheduling, input-output control, memory management, and communication control and related services.

The internet call routing application 180, presence engine 182 and rules engine 184 are source programs, executable program (object code), script, or any other entity comprising a set of instructions to be performed. When these applications 180, 182, 184 are source programs, the program needs to be translated via a compiler, assembler, interpreter, or the like, which may or may not be included within the memory 172, so as to operate properly in connection with the O/S 178. Furthermore, the applications 180, 182, 184 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 174 typically includes input devices, for example but not limited to, an ethernet connection jack for sending/receiving a data signal to/from an SCP 112. The I/O devices 174 may further include devices that communicate both inputs and outputs, for instance but not limited to, a radio frequency (RF) or other transceiver, a telephonic interface, a bridge, a router, etc.

When the system 116 is in operation, the processor 170 is configured to execute software stored within the memory 172, to communicate data to and from the memory 172, and to generally control operations of the system 116 pursuant to the software. The applications 180, 182, 184 and the O/S 178, in whole or in part, but typically the latter, are read by the processor 170, perhaps buffered within the processor 170, and then executed.

When the applications 180-182, 184 are implemented in software, as is shown in FIG. 1B, it should be noted that the applications 180, 182, 184 are stored on any computer readable medium for use by or in connection with any computer related system or method. In the context of this document, a computer readable medium is an electronic, magnetic, optical, or other physical device or means that is operable to contain or store a computer program for use by or in connection with a computer related system or method. The applications 180, 182, 184 in some implementations, among others, are embodied in any computer-readable medium for use by or in connection with an instruction execution system, apparatus, or device, such as a computer-based system, processor-containing system, or other system that is operable to fetch the instructions from the instruction execution system, apparatus, or device and execute the instructions. In the context of this document, a "computer-readable medium" is any means that is operable to store, communicate, propagate, or transport the program for use by or in connection with the instruction execution system, apparatus, or device. The computer readable medium in various implementations, among others, is, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that in some embodiments, among others, the computer-readable medium is paper or another suitable medium upon which the program is printed, as the program can be electronically captured, via for instance optical scanning of the paper or other medium, then compiled, interpreted or otherwise processed in a suitable manner if necessary, and then stored in a computer memory.

The internet call routing application 180 shown operates to give instructions to the SCP 112 on how to handle an incoming call. In particular, the internet call routing application 180 stored and executed on the system 116 could provide a valuable server to a multitude of customers. In the various embodiments, among others, of the internet call routing system 116, the internet call routing application 180 could be operable to provide intelligent remote caller ID, provide call forwarding based upon rules set by the customer, provide call forwarding based upon presence of a user, or combinations thereof.

Figure 2:
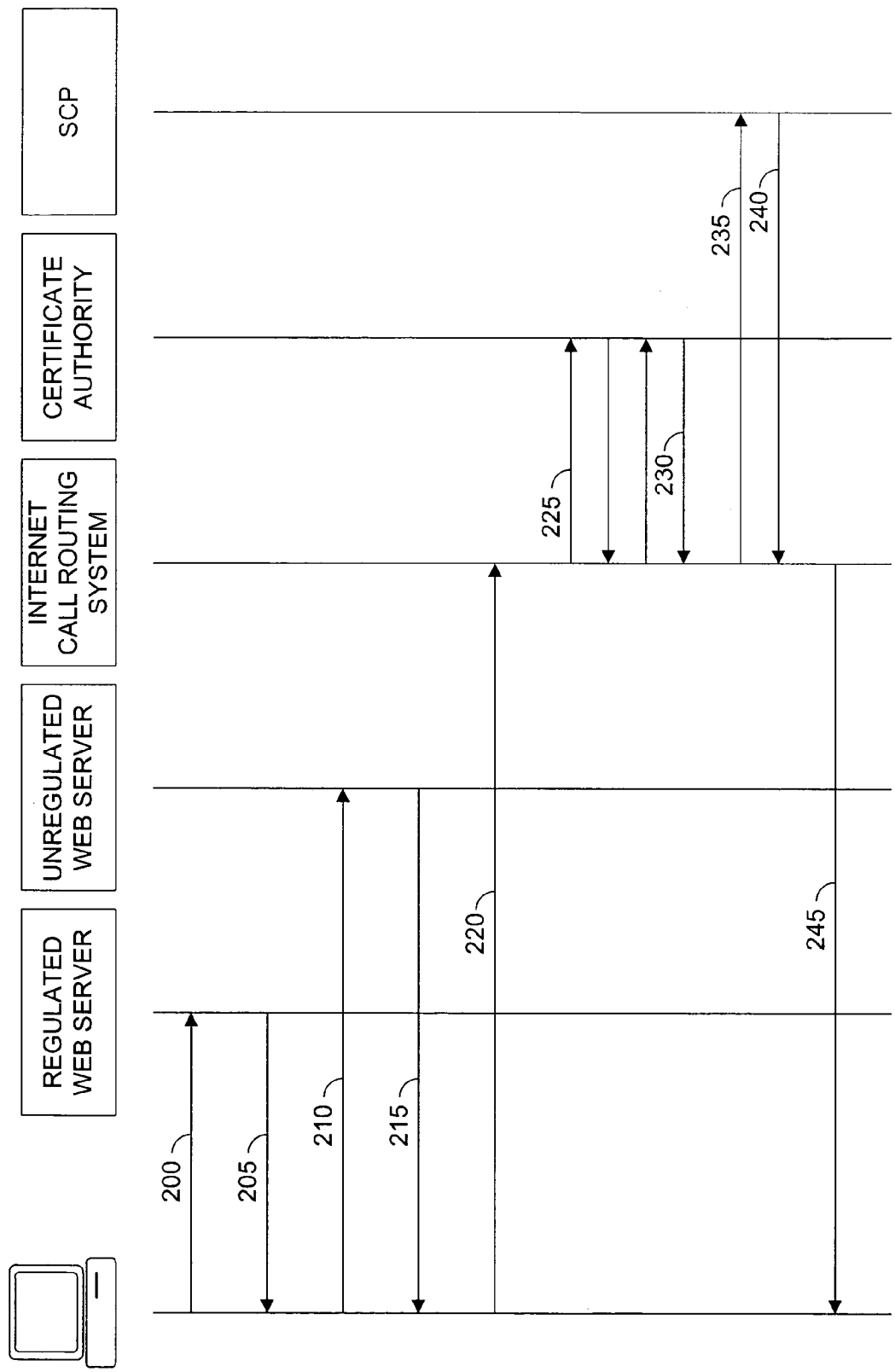
FIG. 2 is a flow diagram of an embodiment, among others, of the installation of software to enable the user to use the internet call routing system of FIG. 1A.

Referring now to FIG. 2, shown is a process flow diagram illustrating an embodiment, among others, of a download and install process for the internet call routing system 116 (FIG. 1A). In step 200, an internet connected computer 122 requests a service from the regulated web server 134. One skilled in the art should appreciate, as described above, that phone service providers are required by the FCC to have a separate web server for regulated phone service. However, as would be understood by those skilled in the art, other embodiments exist wherein the regulated and unregulated services are supported by the same web server. Typically, the user would use his or her telephone number/account number and a password to access a web page representation which enables a user to make changes to service plan associated with the user. Moreover, the user would provide an e-mail address to the regulated web server 134. As one skilled in the art should understand, the e-mail address in some embodiments, among others, could already be known based upon the telephone number (e.g. the regulated web server could query a centralized customer database which is operable to store information regarding each of the services provided to the customer). In these embodiments, the customer would not provide the e-mail address, though, in some implementations, among others, the customer confirms his or her e-mail address before proceeding.

Upon requesting the service, the regulated web server 134 would typically update the user's record in a database (not shown), reflecting the request for the change. In step 205, the regulated web server 134 would automatically e-mail a certificate to the user at an e-mail address specified by the user in step 200. The certificate, as known in the art, is used to authenticate a user to the certificate authority 140 in later steps. It should be recognized that in various embodiments of the present disclosure a user could obtain the certificate by methods other than the web server, such as, for example, but not limited to, an operator taking the user's request to change service and mailing (e-mail or post) the certificate to the user.

In step 210 the user can request software from the unregulated web server 138. Typically, the user would select a link for downloading the software from a web page representation supplied by the unregulated web server 138. As is known in the art, the file is transferred to the computer 122 according to any of a variety of transfer protocols in step 215.

After downloading the software, the user typically begins the installation process at his or her computer 122 using an installation wizard typically included within the software download. During installation, the installation wizard typically asks the user for the location of the certificate sent to the user by the regulated web server 134. It should be recognized by one skilled in the art that in some embodiments, among others, the installation wizard searches a standard location for the certificate. Alternatively, the installation wizard provides a search window which is pre-populated with the standard location, enabling the user to change the location to a custom location or search for the certificate himself or herself. The installation wizard then typically contacts the internet call routing system 116 (via an ISP and other intermediate routers) in step 220. The installation wizard typically provides the user's internet account information as well as the certificate provided by the regulated web server 134 to the internet call routing system 116.

The internet call routing system typically then initiates an MD5 hashing sequence with the certificate authority 140 in step 225. In step 230, the certificate authority 140 provides approval to the internet call routing system responsive to whether the user is authenticated by the MD5 hashing sequence. It should be recognized by those skilled in the art that there exist many alternative authentication mechanisms which are intended to be included within the scope of the present disclosure.

In step 235, the internet call routing system provides the certificate to the SCP 112, along with instructions that the certificate should be provided every time the SCP 112 sends a query to the internet call routing system 116 regarding the called party. In step 240, the SCP 112 acknowledges the request. In step 245, the internet call routing system notifies the installation wizard at the computer 122 that the installation was successful. The installation wizard then typically completes the installation process.

One skilled in the art should recognize, however, that in alternative implementations, among others, the certificate could be stored at the internet call routing system 116, and retrieved based upon the account/phone number provided by the SCP 112. In this alternative implementation, the SCP stores the phone number for called parties registered with the internet call routing system 116 and an IP address for the internet call routing system 116. The SCP 112 in this alternative implementation would forward the query for a registered called party to the internet call routing system 116. Such a query would include the telephone/account number for the registered called party.

Figure 3:
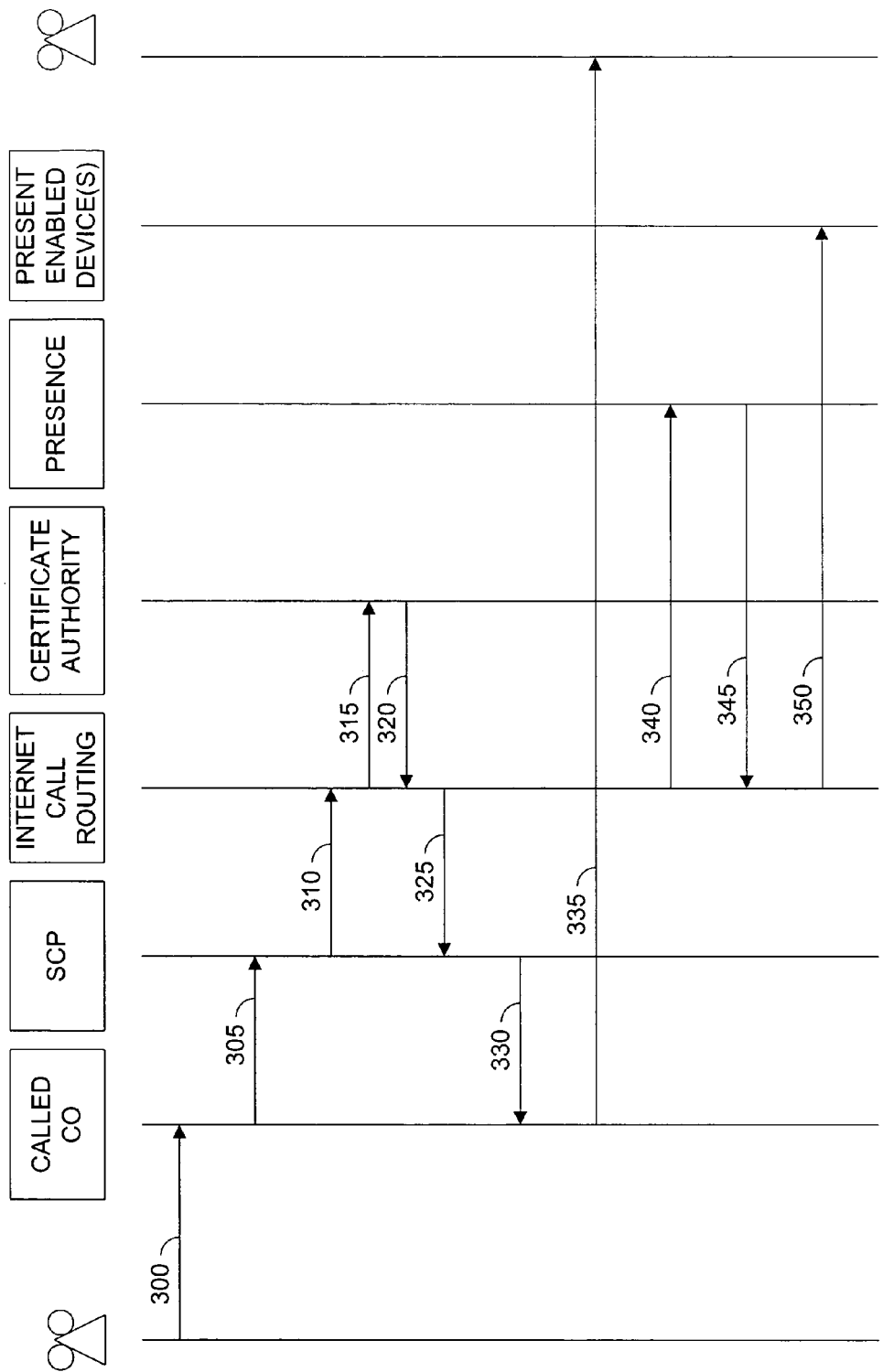
FIG. 3 is a call flow diagram of an embodiment, among others, of the internet call routing system of FIG. 1A.

Referring now to FIG. 3, shown is a call flow diagram for an embodiment, among others, of the internet call routing system 116 of FIG. 1A. In step 300, the calling party telephone 106 sends a request to connect to a called party telephone 108. In step 305, the CO 110 associated with the called party receives the call request and activates a termination attempt trigger (TAT). The TAT typically triggers a query to an SCP 112, as shown in step 305. As discussed above, the query is made to determine whether the called party has any specific handling instructions for the call (e.g. include caller ID, call waiting, voicemail, etc).

Conventionally, the SCP 112 would query a customer database for the called party profile and responds to the called CO 110 with instructions for completing the call. However, in step 310, the SCP sends a query to an internet call routing system 116. The query to the internet call routing system typically includes the account, the called number, a registration ID, and the certificate (except in the implementation noted above where the certificate is stored at the internet call routing system 116). In alternative embodiments, among others, the query include the telephone number of the calling party, in embodiments, among others, where the called party is able to set rules based upon the calling party number. As such, in the embodiments where the called party is able to set rules based upon the calling party number, automatic number identification (ANI) information is always included in the query to the internet call routing system 116. One skilled in the art should recognize that the query from the SCP 112 to the internet call routing system 116 is typically sent through a gateway 118 to bridge the protocols between the PSTN (e.g., SS7) and the internet (e.g., IP). This step is not shown in FIG. 3.

Upon receiving the query from the SCP 112, the internet call routing system 116 sends the certificate to the certificate authority 140 in step 315. The certificate authority 140 determines whether the user is in good standing, and continues to subscribe to the internet call routing system. If the user still subscribes to the service, the certificate authority 140 responds to the internet call routing system 116 in step 320.

If the user continues to subscribe to the system, the internet call routing system 116 can check its database 118 for a plurality of rules to apply to the call. In FIG. 3, the rules have been set up, in one example, by degault, such that notification of the call is sent to all enabled devices at which the user is "present." However, in this example, the call is still routed to the called number.

As such, in step 325, the internet call routing system 116 provides instructions for completing the call to the SCP 112. In step 330, the SCP 112 forwards the instructions to the called party CO 110. The called party CO 110 then attempts to terminate the call at the called party telephone 108. Typically the termination attempt includes ringing the called party telephone 108 and waiting for a person to pick up the handset, at which point, the called is connected.

Substantially simultaneously with steps 325-335, the internet call routing system 116 sends a presence query to a presence engine 132. The presence query is an attempt to determine what enabled (registered) devices are present on the internet 120. As such, the presence query typically includes those internet message capable receive devices 122-128 which the user has registered with the internet call routing system 116. These devices 122-128 include, in various embodiments, among others: WAP phones, wireless phones, IP phones, internet connected computers, set top boxes, SMS enabled phones, etc. The presence engine 132 typically responds to the presence query with the device(s) at which the user's current status is "present," in step 345. One skilled in the art should understand that there are alternative embodiments, among others, of the present disclosure wherein the presence engine 132 can be set up to respond to the presence query with different levels of presence based upon different status indicators collectable by the presence engine, including, for example, among others: "present," "available,"  "online," etc. "Available" typically refers to the status of the user as having a client open on the registered device. "Present" typically refers to the user being physically present at an "available" registered device, based upon movement, current use of the device, etc.

The internet call routing system 116 then sends an IP based message to each of the devices that were included as present by the presence engine 132, in step 350. It should be recognized, however, that alternative embodiments, among others, include sending a message to a single registered device or specific registered devices based upon a rule (or rules) set up by the called party. The internet call routing system 116 typically interfaces with a variety of different servers, through which the messages are sent. The messages typically include information regarding the call, such as for example, but not limited to, calling party telephone number, name of the calling party, and date/time of the call. Thus, a cellular phone customer, for example, could know that an individual is attempting to call him or her on a landline phone associated with the cellular customer. Moreover, such a message would enable the cellular phone customer, for example, to call the calling party back from the cellular phone or a nearby landline phone.

Figure 4:
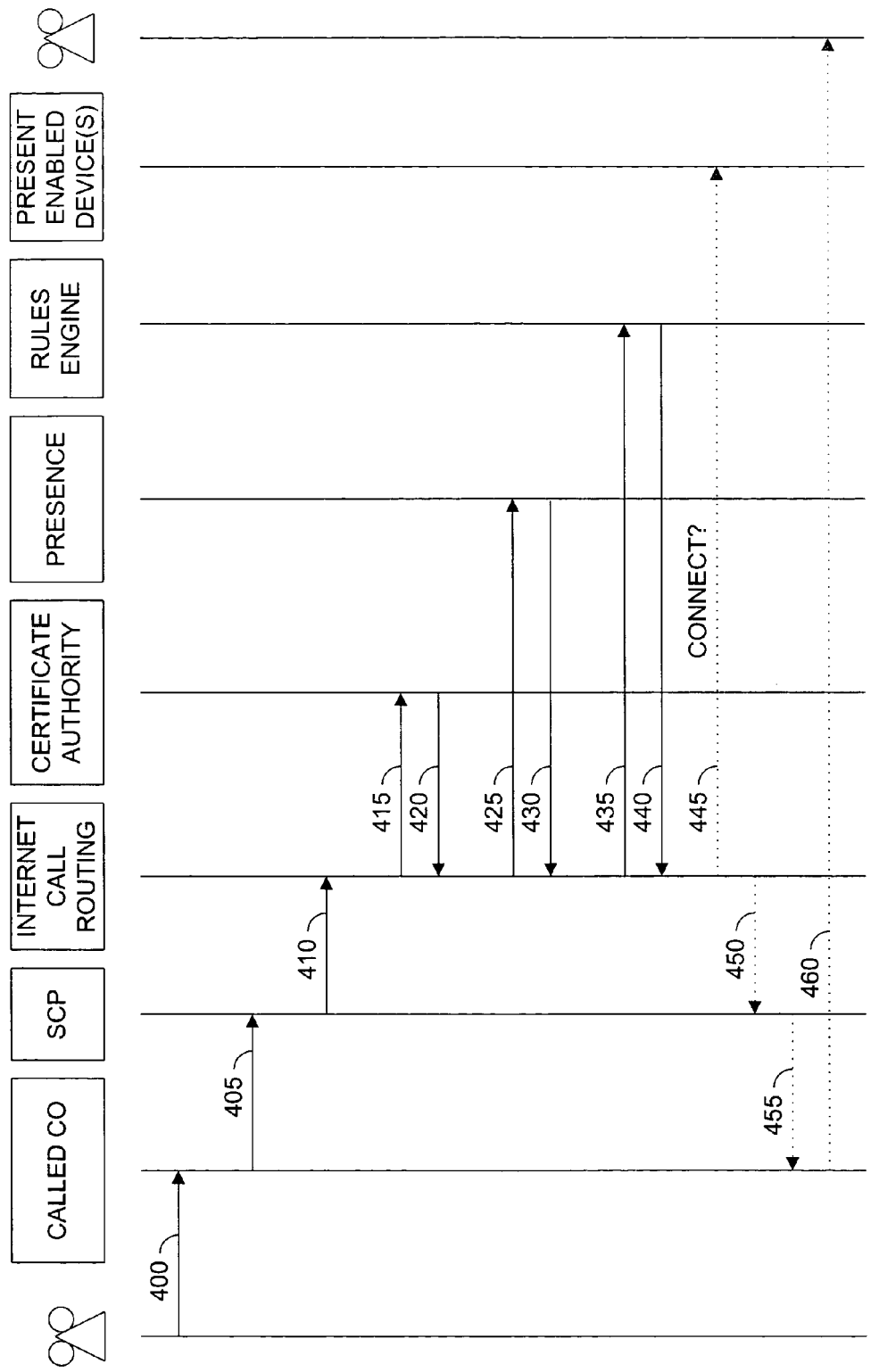
FIG. 4 is a call flow diagram of an embodiment, among others, of the internet call routing system of FIG. 1A.

Referring now to FIG. 4, shown is a call flow diagram of an embodiment, among others, of the internet call routing system 116. As described above, the internet call routing system 116 of FIG. 1A in some implementations, among others, is operable to forward a call based upon rules set by a user associated with the called party telephone. In step 400, the calling party telephone sends a connection request to the called party central office 110. As one skilled in the art should recognize, there are intermediate points, such as, for example, a calling party CO and transfer point(s).

Upon receiving the call request, the called party CO 110 activates a TAT. The TAT initiates a query from the called party CO 110 to the SCP 112, as shown in step 405. It should be noted that the PSTN typically includes intermediate transfer points between the called party CO 110 and the SCP 112. The query sent from the called party CO 110 to the SCP 112 includes the called party telephone number. As one skilled in the art should recognize, the CO does not typically attempt to connect the call until instructions are received from the SCP 112.

Upon receiving the query from the called party CO 110, the SCP 112 retrieves account information from a database 114. The account information retrieved from the database 114 typically includes the account number associated with the user, a certificate, and a registration ID for the user. In step 410, the SCP 112 sends a query to the internet call routing system 116. The query to the SCP 112 typically includes the certificate, account number, phone number and registration ID.

The internet call routing system 116 then determines whether the called party subscribes to the internet call routing service by sending a query to the certificate authority 140, as shown in step 415. The query typically includes the account number and the certificate associated with the called party. The certificate authority 140 authenticates the certificate.

Upon completion of the authentication process and ensuring that the called party continues to subscribe to the internet call routing service, the certificate authority sends the result of the determination to the internet call routing system, as shown in step 420. The internet call routing system 116 then typically searches the database for the registered devices associated with the account number. In step 425 the internet call routing system 116 queries the presence engine 132. The query typically includes each of the registered devices 122-

128 associated with the user, such that the presence engine 132 can determine status of those devices.

In step 430, the presence engine 132 responds back to the internet call routing system 116 with the status of each of the devices 122-128 included within the query. The internet call routing system 16 also retrieves rules from the database 118, in some embodiments, among others, of the present disclosure. In step 435, the internet call routing system 116 sends the rules to a rules engine to be parsed. The rules can typically include such controls as time/date restrictions, calling party restrictions, present device restrictions, etc., or combinations thereof.

The rules engine then parses the rules set up by the user. In step 440, the rules engine responds to the query from the internet call routing system 116 with instructions as to what to do regarding the incoming call. It should be recognized that in some embodiments, among others, of the present disclosure, that the query to the rules engine is made before, or concurrently with, the query to the presence engine. In the implementation where the query to the rules engine is made before the query to the presence engine, some devices, or all devices, depending on the rules set by the user, may not need to be queried for presence.

Based upon the result of the rules engine query and the presence query, the internet call routing system 116 is operable to connect the call to any of the enabled devices such as the cellular phone 124, IP phone 126, or another voice capable two way communications device, as shown in step 445. As such, the internet call routing system 116 sends instructions back to the SCP 112 to forward the call to at least one number provided by the internet call routing system 116. The number provided by the internet call routing system 116 is typically the number for any enabled device which meets the criteria of the rules and/or at which the user is present. It should be recognized, however, that the system could be set up to terminate the call request to an IP device via the internet call routing system 116 in alternative embodiments of the present invention.

Furthermore, based upon the results of the rules engine query and the presence query, the internet call routing system 116 is operable to instruct the SCP 112 to attempt to connect the call to the called party telephone 108, as shown in step 450. The SCP 112 in step 455 forwards the instructions from the internet call routing system 116 to the called party CO 110. The called party CO 110, in step 460, attempts to connect the call to the called party telephone 108. If the called party CO 110 senses an off-hook the call is connected. Otherwise, the phone typically continues to ring until the calling party discontinues the attempt to connect, or the CO 110 is instructed to connect the calling party telephone 106 to the voicemail system 130.

Figure 5:
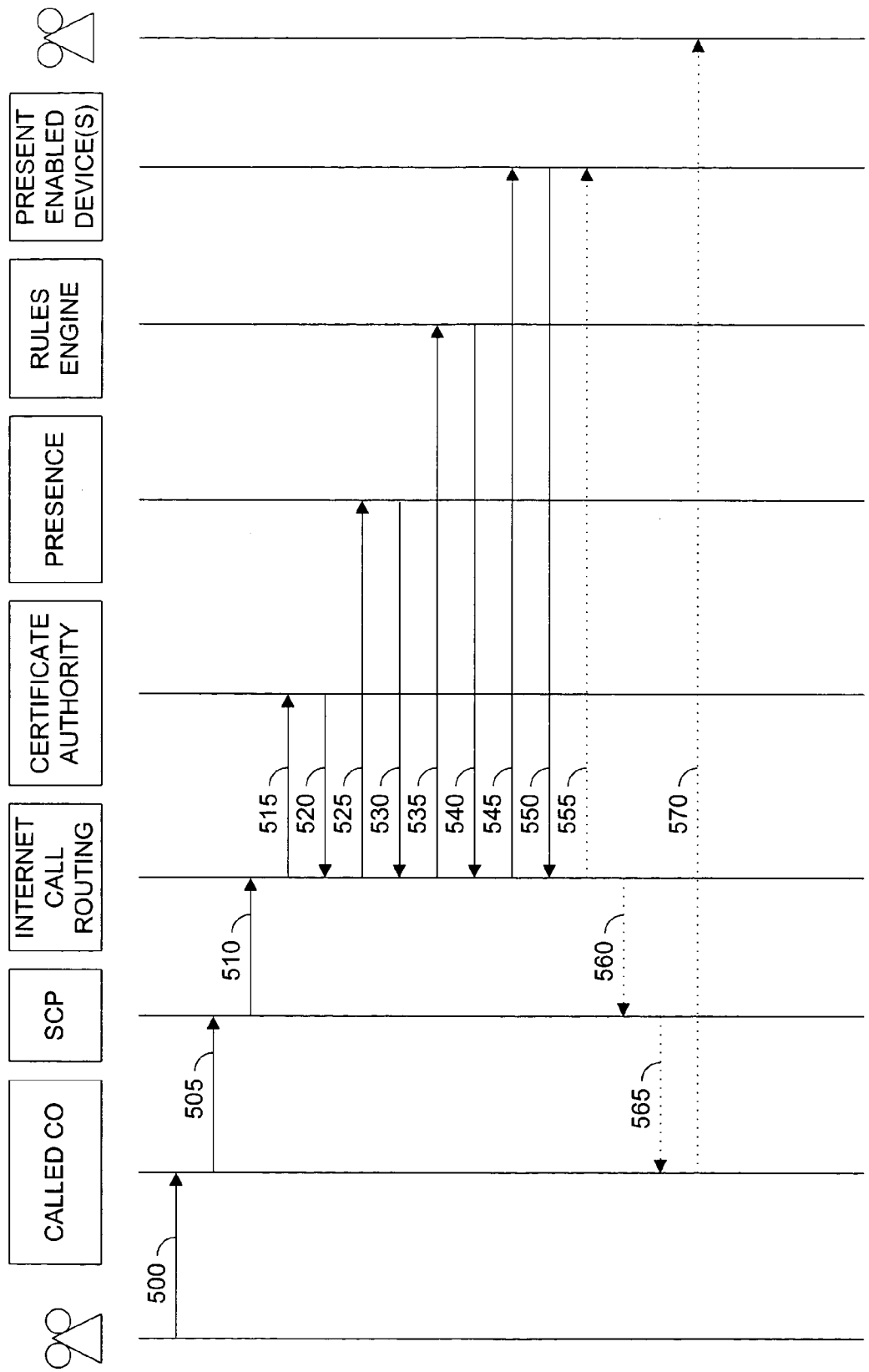
FIG. 5 is a call flow diagram of an embodiment, among others, of the internet call routing system of FIG. 1A.

Referring now to FIG. 5, shown is a call flow diagram of an embodiment, among others, of the internet call routing system 116 shown in FIG. 1A. As described above, the internet call routing system 116 in some implementations, among others, is operable to forward a call based upon interaction with a user associated with the called party telephone. In step 500, the calling party telephone sends a call request to the called party central office 110.

Upon receiving the call request, the called party CO 110 activates a TAT. The TAT initiates a query from the called party CO 110 to the SCP 112 in step 505. It should be noted that the PSTN typically includes intermediate transfer points between the called party CO 110 and the SCP 112. The query sent from the called party CO 110 to the SCP 112 includes the called party telephone number. As one skilled in the art should recognize, the CO 110 does not typically attempt to connect the call until instructions are received from the SCP 112.

Upon receiving the query from the called party CO 110, the SCP 112 retrieves account information from a database 114. The account information retrieved from the database 114 typically includes the account number associated with the user, a certificate, and a registration ID for the user. In step 510, the SCP 112 sends a query to the internet call routing system 116. The query to the SCP 112 typically includes the certificate, account number, phone number and registration ID.

The internet call routing system 116 then determines whether the called party subscribes to the internet call routing service by sending a query to the certificate authority 140, as shown in step 515. The query typically includes the account number and the certificate associated with the called party. The certificate authority 140 authenticates the certificate.

Upon completion of the authentication process and ensuring that the called party continues to subscribe to the internet call routing service, the certificate authority sends the result of the determination to the internet call routing system, as shown in step 520. The internet call routing system 116 then typically searches the database for the registered devices associated with the account number. In step 525 the internet call routing system 116 queries the presence engine 132. The query typically includes each of the registered devices 122-128 associated with the user, such that the presence engine 132 can determine status of those devices.

In step 530, the presence engine 132 responds back to the internet call routing system 116 with the status of each of the devices 122-128 included within the query. The internet call routing system 116 also retrieves rules from the database 118, in some embodiments, among others, of the present disclosure. In step 535, the internet call routing system 116 sends the rules to a rules engine to be parsed. The rules can typically include such controls as time/date restrictions, calling party restrictions, present device restrictions, etc., or combinations thereof.

The rules engine then parses the rules set up by the user. In step 540, the rules engine responds to the query from the internet call routing system 116 with instructions as to what to do regarding the incoming call. It should be recognized that in some embodiments, among others, of the present disclosure, that the query to the rules engine is made before, or concurrently with, the query to the presence engine. In the implementation where the query to the rules engine is made before the query to the presence engine, some devices, or all devices, depending on the rules set by the user, may not need to be queried for presence.

Based upon the result of the rules engine query and the presence query, the internet call routing system is operable to send an internet-based message to any of the enabled devices as shown in step 545. The internet-based message would typically include a prompt for the user to choose how he or she would like the call to be terminated. Choices for termination of the call typically include, among others: letting the phone ring at the dialed number; forwarding the call to a voicemail system 130 forward the call to any of a number of previously designated numbers; forward the call to a default number; forward the call to a number corresponding to the location at which the internet-based message was checked; and, forward the call to a number that the user designates in response to the internet-based message.

In response to the prompt, the user would typically reply by choosing one of the termination options presented, as shown in step 550. It should be recognized by those skilled in the art, that some embodiments, among others, include software added to the registered device such that a user could send a return message and choice by pushing a button associated with his or her choice. In this embodiment, the registered device is provided to the user with the new software, or the software is downloaded to the registered device by the user. The software is set up to communicate over TCP/IP with the internet call routing system 116 once it registers itself online. The software then receives incoming internet-based messages from the internet call routing system 116. In some implementations, the options presented to the user are included in the internet-based message from the internet call routing system 116. The software reads the options, presents the options to the user, and allows the user to choose an option by pressing a button associated with one of the options. Upon pressing a button associated with one of the options, the software is configured to send a message back to the internet call routing system alerting the system to the user's choice. In alternative embodiments, among others, there may be standard choices which are stored by the software at the registered device. In such an embodiment, the software would present the stored standard choices to the user upon receiving the internet-based message from the internet call routing system 116, enabling the user to choose any of the standard options.

Based on the choice by the user according to any of the embodiments described above, the connection could be made to the present device as shown in step 555. Alternatively, the internet call routing system could instruct the SCP 112 to ring the call to the dialed location as shown in step 560. The SCP 112 then forwards the instruction to the called CO 110 in step 565. The called CO 110 then sends a ring signal to the called party telephone 108 in step 570, and connects the call if an off-hook signal is received. It should be recognized that there exist numerous options for terminating the call according to the prompt, some of which were outlined above, and that each of these termination options are intended to be included within the scope of the present disclosure.

Figure 6A:
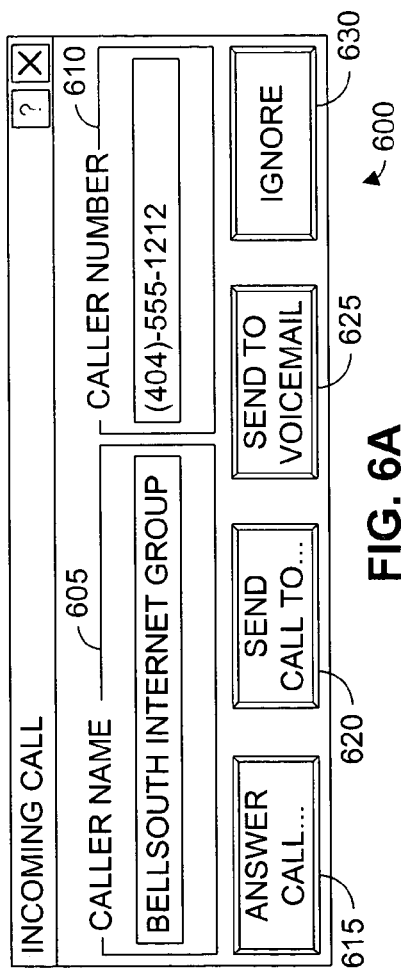
FIG. 6A is a sample screen shot of an embodiment, among others, of a client screen of the internet call routing system of FIG. 1A.
Figure 6B:
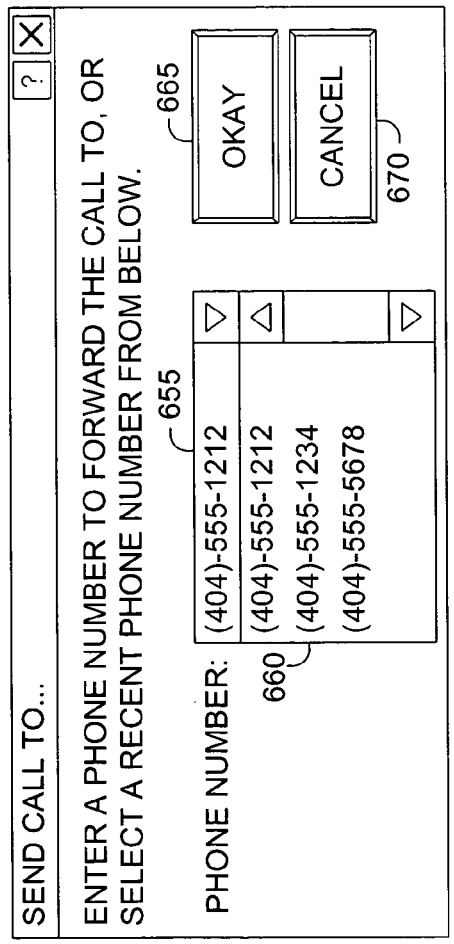
FIG. 6B is a sample screen shot of an embodiment, among others, of a call forward instruction screen of the internet call routing system of FIG. 1A.

Referring now to FIGS. 6A and 6B, shown are sample screen shots of an embodiment, among others, of an "incoming call" message screen representation 600, and a "send call to" screen representation 650 on a personal computer. One skilled in the art should understand that similar screen representations of the prompts would be used for the other registered devices of the present disclosure. These screen representations 600, 650 are generated by the software installed on the registered device(s), and appear when the registered device has received an internet based message from the internet call routing system 116.

With respect to the "incoming call" message screen representation 600, included in one embodiment, among others, are the caller name field representation 605, the caller number field representation 610, and a plurality of instruction button representations 615-630. The caller name field representation 605 includes the name of the person (or company) calling, if that information was included in the query to the internet call routing system 116. The caller number field representation 610 indicates the number of the person (or company) calling. The button representations 615-630, in some embodiments, among others, include: an "answer call" button representation 615; a "send call to" button representation 620; a "send to voicemail" button representation 625; and, an "ignore" button representation 630. The "answer call" button representation 615 instructs the internet call routing system 116 to send instructions to the SCP 112 to route the call to the present location. The "send call to" button representation 620 instructs the software to send a message to the internet call routing system 116 to instruct the SCP 112 to route the call to a specified number (as specified by screen representation 650). The "send to voicemail" button representation 625 instructs the internet call routing system 116 to instruct the SCP 112 to send the call to a voicemail system 130. The "ignore" button representation 630 instructs the internet call routing system 116 to instruct the SCP 112 to perform normal routing on the call (e.g. send the call to the dialed number, voicemail, automatic callback, call forwarding, etc.).

With respect to FIG. 6B, the "send call to" screen representation 650 enables the user to specify a number to which the SCP 112 will forward the call. The software on the registered device generates the "send call to" screen representation 650, upon the user choosing the "send call to" button representation 620 of FIG. 6A. The user is enabled to specify a number in field representation 655. Alternatively, the user is able to choose a number from a dropdown list representation 660. Once the user has selected a number, the user selects the "okay" button representation 665 by moving the mouse cursor over the button representation and pressing a mouse button. This returns an internet-based message to the internet call routing system 116 with instructions regarding where to route the call, as described above. Alternatively, the user is also able to select the "cancel" button representation 670, which typically returns the user to the "incoming call" message screen representation 600.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should also be emphasized that the above-described embodiments of the present disclosure are merely possible examples of implementations set forth for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure and the present disclosure and protected by the following claims.

What is claimed is:

1. An intelligent interactive call handling system, comprising:
 a central office operable to trigger a query responsive to receiving a call request for a called party at a called party telephone number;

call-handling device coupled to the central office, the call-handling device operable to receive the query, and trigger an internet call routing query; and an internet call routing system coupled to the call-handling device, the internet call routing system being operable to receive the internet call routing query, send a notification of the incoming call to the called party at a plurality of registered communication devices that the called party is detected to be present, the notification prompting the called party for instruction for handling the incoming call, in accordance with instruction from the called party that is received in reply to the notification; and instruct the call-handling device to route the call to the called party telephone number if no instruction is received from the called party in reply to the notification after a set period of time, wherein the call-handling device forwards the instructions from the internet call routing system to the central office.

2. The system of claim 1, further comprising a certificate authority coupled to the internet call routing system, the certificate authority being operable to authenticate the called party by searching a customer database for current subscription and payment information.

3. The system of claim 1, further comprising a presence engine coupled to the internet call routing system, the presence engine being operable to determine the presence of any of said at least one registered communication device.

4. The system of claim 1, wherein the internet call routing query comprises an account number associated with the called party, a phone number associated with the called party, a registration identification associated with the called party, and a certificate associated with the called party.

5. The system of claim 1, further comprising a gateway coupled between the call-handling device and the internet call routing system, the gateway being operable to translate protocols between the signaling system-7 protocol and the internet protocol.

6. The system of claim 1, further comprising at least one of a short message service server, an electronic mail server, an instant messaging server and a simple object access protocol server, said server(s) being coupled to the internet call routing system, and being operable to forward the notification to a registered communication device responsive to instructions from the internet call routing system.

7. An internet call routing system, comprising:

receive logic operable to receive a call query to a called party telephone number from a call-handling device via a gateway;

call notification logic being operable to send a notification to the called party via a plurality of registered communication devices that the called party is detected to be present, the notification prompting the called party for instruction for handling the incoming call; and forwarding logic coupled to the call notification logic, the forwarding logic being operable to forward a call associated with the call query to the registered communication device in accordance with instruction from the called party that is received in reply to the notification; and instruct the call-handling device to route the call to the called party telephone number if no instruction is received from the called party in reply to the notification after a set period of time.

8. The system of claim 7, further comprising:

a database operable to store a profile associated with the called party including a list comprising said at least one registered communication device, the database being operable to provide the list associated with the called party to the presence logic.

9. The system of claim 7, wherein the call notification logic comprises at least one of a short message server, an electronic mail server, a simple object access protocol server, and an instant messaging server.

10. The system of claim 7, wherein the call query comprises an account number associated with the called party, a phone number associated with the called party, a registration identification associated with the called party, and a certificate associated with the called party.

11. The system of claim 10, further comprising authentication logic coupled to the receive logic operable to employ the certificate associated with the called party to authenticate the called party.

12. The system of claim 11, wherein the authentication logic authenticates the called party, and assures that the called party continues to subscribe to a service provided by the internet call routing system.

13. The system of claim 7, further comprising a rules engine, the rules engine being operable to parse at least one rule associated with the called party, and user-interface logic is operable to send a prompt to the called party via said at least one registered communication device responsive to the presence determination and rules engine, and receive a reply from the called party.

14. The system of claim 7, wherein said at least one registered communication device comprises at least one of a cellular phone and an internet protocol phone.

15. A method of providing intelligent interactive call handling, comprising:

receiving a call query to a called party telephone number from a call-handling device via a gateway;

sending a notification to the called party via a plurality of registered communication devices that the called party is detected to be present;

generating a signal to initiate connection of the call to the registered communication device in accordance with instruction from the called party that is received in reply to the notification; and sending instructions to the call-handling device to route the call to the called party telephone number if no instruction is received from the called party in reply to the notification after a set period of time.

16. The method of claim 15, wherein the method further comprises:

storing a profile associated with the called party including a list comprising the registered communication devices.

17. The method of claim 16, wherein the method further comprises:

storing a profile associated with the called party, the profile also including at least one rule for sending a prompt to the called party.

18. The method of claim 17, further comprising:

parsing said at least one rule prior to sending the prompt to the called party; and sending a message to the called party via at least one registered communication device responsive to the parsing.

19. The method of claim 18, wherein the prompt is an internet-based message.

20. The method of claim 15, further comprising:

using at least one of a short message server, an electronic mail server, a simple object access protocol server, and an instant messaging server, to send the notification to the called party via said plurality of registered communication devices.

21. The method of claim 20, wherein said plurality of registered communication devices includes at least one of a cellular phone and an internet protocol phone.

22. The method of claim 15, wherein the call query comprises an account number associated with the called party, a phone number associated with the called party, a registration identification associated with the called party, and a certificate associated with the called party.

23. The method of claim 22, further comprising using the certificate associated with the called party to authenticate the called party.

24. A computer readable medium having a program for providing intelligent interactive call handling, the program having instructions for performing:
   receiving a call query to a called party telephone number from a call-handling device via a gateway;
   sending a notification to the called party via a plurality of registered communication devices that the called party is detected to be present;
   generating a signal to initiate connection of the call to the registered communication device in accordance with instruction from the called party that is received in reply to the notification; and
   sending instructions to the call-handling device to route the call to the called party telephone number if no instruction is received from the called party in reply to the notification after a set period of time.

25. The computer readable medium of claim 24, wherein the program further performs:
   storing a profile associated with the called party including a list comprising the registered communication devices.

26. The computer readable medium of claim 25, wherein the program further performs:
   storing a profile associated with the called party, the profile also including at least one rule for sending a prompt to the called party.

27. The computer readable medium of claim 26, the program further performing:
   parsing said at least one rule prior to sending the prompt to the called party; and
   sending a message to the called party via at least one registered communication device responsive to the parsing.

28. The computer readable medium of claim 27, wherein the prompt is an internet-based message.

29. The computer readable medium of claim 24, the program further performing:
   using at least one of a short message server, an electronic mail server, a simple object access protocol server, and an instant messaging server, to send the notification to the called party via said at least one registered communication device responsive to the presence determination.

30. The computer readable medium of claim 29, plurality of registered communication devices includes at least one of a cellular phone and an internet protocol phone.

31. The computer readable medium of claim 24, wherein the call query comprises an account number associated with the called party, a phone number associated with the called party, a registration identification associated with the called party, and a certificate associated with the called party.

32. The computer readable medium of claim 31, the program further performing using the certificate associated with the called party to authenticate the called party.

* * * * *